United States Patent [19]
Eriksen et al.

[11] 4,158,163
[45] Jun. 12, 1979

[54] INVERTER CIRCUIT

[75] Inventors: Henry R. Eriksen, Nordborg; Hans M. Beierholm, Augustenborg, both of Denmark

[73] Assignee: Danfoss A/S, Nordborg, Denmark

[21] Appl. No.: 843,408

[22] Filed: Oct. 19, 1977

[30] Foreign Application Priority Data

Oct. 25, 1976 [DE] Fed. Rep. of Germany ....... 2648150

[51] Int. Cl.² .............................................. H02P 5/34
[52] U.S. Cl. ..................................... 318/798; 363/37; 363/79
[58] Field of Search ............... 318/227, 230, 231, 798, 318/803; 363/34, 37, 79

[56] References Cited

U.S. PATENT DOCUMENTS

| 3,512,067 | 5/1970 | Landau | 318/227 |
|---|---|---|---|
| 3,700,986 | 10/1972 | Cushman et al. | 318/227 |
| 3,805,135 | 4/1974 | Blaschke | 318/227 |
| 3,851,234 | 11/1974 | Hoffman et al. | 318/227 |
| 3,983,463 | 9/1976 | Nabae et al. | 318/227 |
| 3,986,088 | 10/1976 | Zankl et al. | 318/227 |
| 4,019,105 | 4/1977 | Cornell et al. | 318/227 |

Primary Examiner—Gene Z. Rubinson
Attorney, Agent, or Firm—Wayne B. Easton

[57] ABSTRACT

The invention relates to an inverter circuit for operating an asynchronous motor having an adjustable speed. The inverter has its output frequency regulatable by a frequency regulator and the D.C. supply has its voltage regulatable by a voltage regulator. There is a desired value frequency regulator having a signal (f) and voltage and current measuring devices having output signals (E) and (I). A control circuit processes these signals (f, E, I) to form input values for the referred to voltage and frequency regulators. The control circuit includes a computer circuit which, from at least two output values and at least one constant, calculates a computed value of the third output value which, together with the first-mentioned output values, given by way of computation a substantially constant slip frequency for a given desired value, and this computed value is compared with a value substantially corresponding to the actual third output value. The three output values are interlinked in the computer circuit in such a way that a constant slip frequency is obtained for the desired frequency value that is fed in. The D.C. voltage supplied to the inverter is regulated so that this condition is maintained independently of the load. The result of this is that the nominal slip for a nominal load also occurs on partial load and this leads to the desired constant speed. This slip frequency can be kept constant even at low loads in that the air gap magnetization is made substantially proportional to the rotor current, i.e. there is under-magnetization.

26 Claims, 16 Drawing Figures

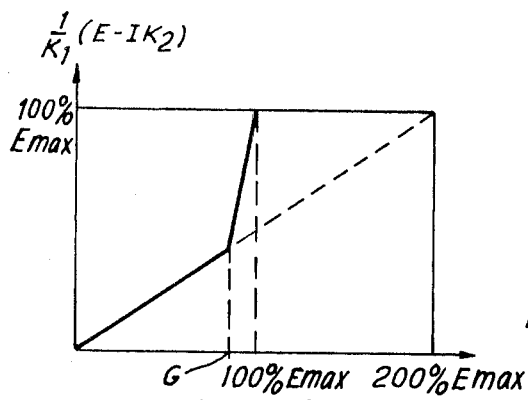
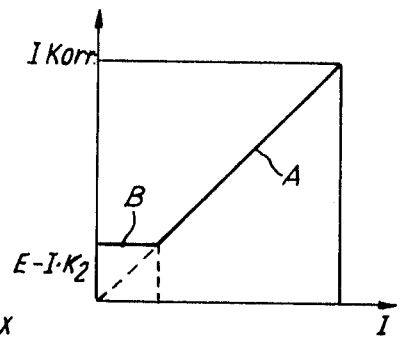
FIG. 11     FIG. 12
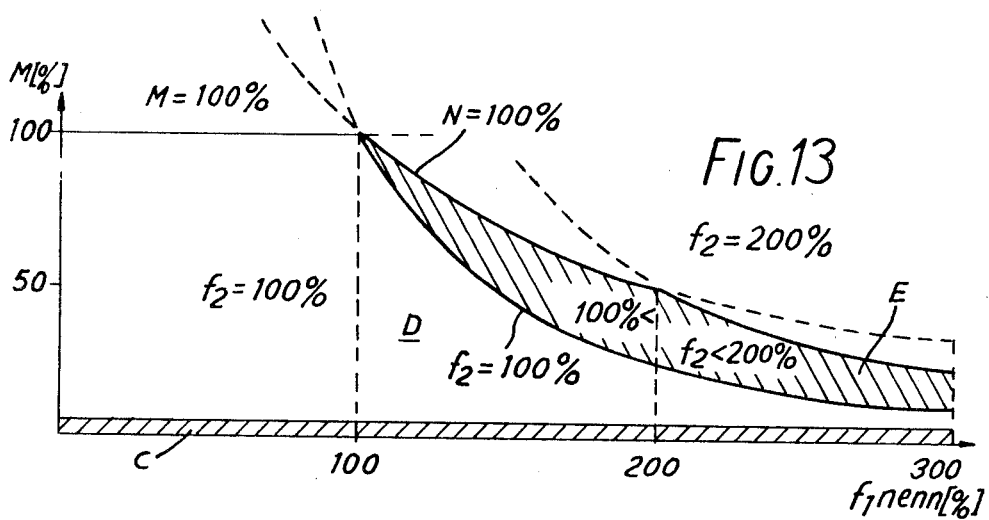
FIG. 13
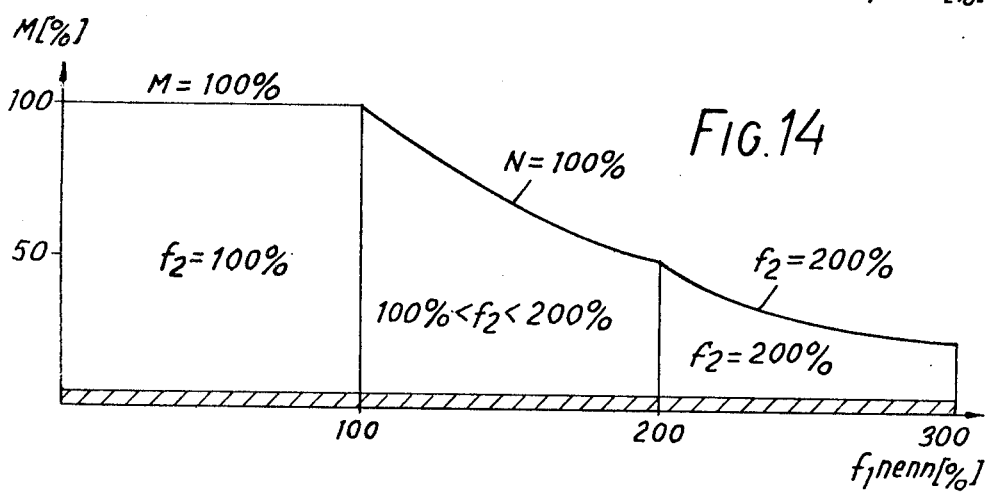
FIG. 14

INVERTER CIRCUIT

The invention relates to an inverter circuit for operating an asynchronous motor of which the rotary speed is adjustable, comprising an inverter having its output frequency regulatable by a frequency regulator, a D.C. supply having its voltage regulatable by a voltage regulator, a desired value input device for changing the output frequency, a voltage measurer and a current measurer each giving an output value, namely a frequency input signal, a voltage measurement signal and a current measurement signal, and a control circuit which processes these output values to form the input values for the voltage regulator and the frequency regulator and has a first comparator which controls the voltage regulator.

In a known inverter of this kind, the operating point is set by means of a potentiometer of which the tapped voltage is compared with a value approximately proportional to the D.C. supply voltage. The frequency is made to follow the supply voltage substantially proportionally. Since the slip and therefore the rotary speed varies with a change in the load of an asynchronous motor, provision is made for slip compensation which increases the D.C. voltage supplied to the inverter and the inverter frequency with an increase in the current. In this way, the speed can be kept approximately constant in a certain operating range.

The invention is based on the problem of providing an inverter circuit of the aforementioned kind which permits the motor speed to be kept constant over a larger operating range and with increased accuracy.

This problem is solved according to the invention in that the control circuit comprises a computer circuit which, from at least two output values and at least one constant, calculates a computed value of the third output value which, together with the first-mentioned output values, gives by way of computation a substantially constant slip frequency for a given desired value, and that this computed value is compared with a value substantially corresponding to the actual third output value.

With this circuit, the three output values are interlinked in the computer circuit in such a way that a constant slip frequency is obtained for the desired frequency value that is fed in. The D.C. voltage supplied to the inverter is regulated so that this condition is maintained independently of the load. The result of this is that the nominal slip for a nominal load also occurs on partial load. This leads to the desired constant speed. This slip frequency can be kept constant even at low loads in that the air gap magnetisation is made substantially proportional to the rotor current, i.e. there is under-magnetisation. This has the further advantage that hunting is avoided of the kind occurring during slip compensation which corrects the frequency of the inverter whilst substantially maintaining the magnetisation.

Even when switching off, no oscillation occurs between the motor and the inverter. The inverter can even be connected to the motor when the latter is already rotating, whereupon the motor changes its speed to that determined by the inverter without first having to come to a standstill.

It is further advantageous that for each load condition a minimum power is automatically set at which neither excessively high magnetic losses occur as a result of a high voltage nor excessively high copper losses occur as a result of an excessively high current. Instead, there will always be a state of equilibrium at which the current and voltage assume an optimum value because they approach this state of equilibrium from opposite sides. If, for example, a motor is suddenly loaded more intensely, the current rises correspondingly because of the higher slip frequency. Consequently, the voltage is regulated to a higher value until the prescribed slip frequency is again reached. During this, however, the current drops, this setting a new state of equilibrium for the current and voltage.

It is also advantageous that no measurements need be undertaken at the motor itself; the measurement signals can be derived directly in front of and/or behind the inverter.

In a preferred embodiment, the computer circuit comprises a computer element with which a value taking the slip frequency into account is introduced and is held constant below the nominal rotary speed at least over the major part of the motor operating range. Since the set slip frequency applies not only to a particular set frequency but also to the main operating range of the motor, one obtains a correspondingly simple lay-out for the computer circuit.

In order that the slip or rotor frequency can be kept constant independently of the load at a set frequency, the formula $$I_2/B = f_2 \cdot \text{constant} \tag{1}$$

applies, wherein $I_2$ is the active current in the rotor of the motor, B is the air gap induction and $f_2$ is the slip or rotor frequency. It was found that one can with an adequate degree of accuracy replace the effective rotor current $I_2$ with the stator current $I_1$ which can, for example, be measured on the D.C. side in front of the inverter. The air gap induction can, with sufficiently high accuracy, be represented by $$B' = \frac{U_1 - I_1 \cdot R_1}{f_1} \cdot \text{constant} \tag{2}$$

wherein $U_1$ is the voltage applied to the motor, $I_1$ is the active current supplied to the motor, $R_1$ is the ohmic resistance of the stator coil and $f_1$ is the frequency of the inverter. The voltage $U_1$ can be derived in front of or behind the inverter. From (1), and (2), one obtains $$\frac{I_1}{U_1 - I_1 \cdot R_1} = \frac{f_2}{f_1} \cdot \text{constant} \tag{3}$$

which shows that, if the slip frequency $f_2$ is kept constant, a relatively simple relationship exists between the three values $I_1$, $U_1$ and $f_1$. If one introduces the primary active current $I_1$ as the current measurement signal I, the primary voltage $U_1$ as the voltage measurement signal E and the desired inverter frequency $f_1$ as the frequency input signal f, then a computed value can be calculated in the computer circuit from at least two of the stated three output values E, I and f.

A particularly simple computer circuit is thus obtained if it calculates the computed value according to the equation $$f = \frac{1}{k_1}\left(\frac{E}{I} - k_2\right) \quad (4)$$

or a conversion thereof.

In a first embodiment, the computer circuit comprises a division circuit fed with the voltage measurement signal as the dividend and the current measurement signal as the divisor, and a downstream subtraction circuit in which a fixed value is subtracted from the quotient. In this case, the computed value is calculated substantially according to the equation $$f' = \frac{1}{k_1}\left(\frac{E}{I} - k_2\right) \quad (5)$$

In a second embodiment, it is ensured that the computer circuit comprises a subtraction circuit in which a voltage-proportional value is subtracted from the voltage measurement signal, and a division circuit fed with the output value of the subtraction circuit as the dividend and the current measurement signal as the divisor. In this case, the calculation of the computed value f' occurs substantially according to the equation $$f' = \frac{E - I \cdot k_2}{I \cdot k_1} \quad (6)$$

In a third embodiment, the computer circuit comprises an addition circuit in which a value proportional to the frequency input signal and a constant value are added, and a division circuit fed with the voltage measurement signal as the dividend and the output value of the addition circuit as the divisor. In this case, calculation of the computed value I' takes place substantially according to the equation $$I' = \frac{E}{f \cdot k_1 + k_2} \quad (7)$$

In a fourth embodiment, it is ensured that the computer circuit comprises a subtraction circuit in which a current-proportional value is subtracted from the voltage measurement signal, and a division circuit fed with the output value of the subtraction circuit as the dividend and the frequency input value as the divisor. In this case, the calculation of the computed value I' takes place substantially according to the equation $$I' = \frac{E - I \cdot k_2}{f \cdot k_1} \quad (8)$$

If the division circuit is not itself adapted to introduce the factor $1/k_1$, a computer element introducing the factor $1/k_1$ can be connected in front of the dividend input or behind the output of the division circuit.

In a fifth embodiment, the computer circuit comprises a multiplication circuit fed with the frequency input signal and the current measurement signal, one of which is multiplied by a first constant, and an addition circuit in which the result of multiplication is added to the current signal multiplied by a second constant. In this case, calculation of the computed value E' is effected substantially according to the equation $$E' = (f \cdot k_1 + k_2)I \quad (9)$$

In all these cases, the constants are desirably adjustable, for example to enable adaptation to a particular motor.

However, at least one constant may also be dependent on at least one of the three output values, i.e. f, E or I, for example in order also to enable the operating range to be extended to frequencies above the nominal motor frequency.

The frequency generator will in the simplest case be controlled directly by the frequency input signal f. However, it is also possible to control the frequency generator by the computed value f' because this is made to follow the input frequency f during operation.

It is advisable to provide a minimum current generator which holds the current measurement signal at a predetermined minimum value for small values of the measured current. This ensures that the computer circuit will also operate reliably at zero torque or near zero torque without indefinite conditions occurring as a result, because a voltage measurement value near zero and a current measurement value near zero have to be divided by one another.

It is also favourable if the output of the first comparator is connected to the output of a second comparator which compares an adjustable maximum power value with the product of a factor corresponding approximately to the measured current and a factor corresponding approximately to the measured voltage and overrides the first comparator when the product exceeds the maximum power value. Desirably, the maximum power value is set to the nominal power of the connected motor. If such a high load torque occurs at a prescribed frequency that the maximum power is exceeded, the second comparator ensures that the inverter frequency is reduced relatively to the input frequency to such an extent that the load torque can be overcome with the nominal power. In the torque-frequency diagram, this gives a power hyperbola which limits the range in which the motor can be operated without overloading.

Further, it is favourable if the output of the first comparator is connected to the output of a third comparator which compares an adjustable maximum torque value with a comparative value corresponding to the measured current and overrides the first comparator when the comparative value exceeds the maximum torque value. The third comparator ensures that a prescribed maximum current is not exceeded in the motor whereby the maximum torque is also determined because the torque is substantially proportional to the square of the motor current.

Further, the computer circuit may comprise a computer element which introduces a factor proportional to the slip frequency and holds it constant up to about the nominal motor frequency, and a switch element which increases this factor above the nominal frequency. In this way it is possible to extend the advantageous properties of the inverter circuit to an operating range that extends beyond the nominal motor frequency even though the D.C. supply voltage is limited to a certain maximum value, generally the nominal motor voltage. If the slip frequency to be held constant increases with an increase in inverter frequency, it is possible to keep the motor speed substantially constant independently of the load torque without increasing the voltage that has to be applied.

The switch element may in particular be mechanically coupled to the setting device of the desired value input device. This ensures that the slip frequency and the input frequency are changed simultaneously.

For example, the switch element is a division circuit which is in series with the computer element in the form of an amplifier and to which a signal variable with the frequency input signal is fed as the divisor.

Another possibility is for the computer element to comprise an amplifier and the switch element to comprise a feedback resistor variable with the frequency input signal.

In this case, the factor may double between the simple and double nominal frequency and substantially remain at this double value on a further rise in frequency.

In another embodiment, the computer circuit comprises a computer element which introduces a factor proportional to the slip frequency and holds it constant in the operating range up to just below the nominal voltage, and a switch element which increases this factor above this voltage limiting value. In this way, the manner of operation of the inverter circuit remains unchanged in the entire operating range of the motor, even at frequencies exceeding the nominal frequency. Correction of the slip is undertaken only in the upper range of the available voltage.

In particular, the switch element may be controlled by a control signal which is equal to the voltage measurement signal reduced by a current-proportional value, and the voltage limiting value corresponds to about 90 to 95% of the nominal motor voltage. The limiting value of the voltage is thus determined by a prescribed percentage of the magnetising voltage.

A particularly simple embodiment for this is obtained if the computer element is an amplifier disposed between the subtraction circuit and division circuit and the switch element alters its degree of amplification and is controlled by the input signal of the amplifier.

It is advisable if the factor approximately doubles continuously between the limiting value and a value corresponding to the nominal voltage. In this way one ensures proper operation at which there is not yet a reduction below the pull-out point.

In some cases it is also desirable to bring other influences into play by correcting the input frequency signal.

For example, the output of the desired value input device can be connected to the output of a fourth comparator which compares an adjustable maximum current value with the current measurement signal and reduces the frequency input signal relatively to the desired value when the current measurement signal exceeds the maximum current. By means of this feature one can likewise prevent the maximum motor current from being exceeded. The fourth comparator therefore corresponds to the above-mentioned third comparator. In this way one also prevents the pull-out torque of the motor from being exceeded on overload because the frequency is necessarily reduced.

In another embodiment, the output of the desired value input device is connected to the output of a fifth comparator which compares an adjustable maximum voltage with the voltage measurement signal and increases the frequency input signal relatively to the desired value when the voltage measurement signal exceeds the maximum voltage. This prevents a prescribed maximum voltage from being exceeded at the motor because the frequency is necessarily increased. This is advantageous for an intensive delay at full speed.

In a preferred circuit, the output of the desired value input device is connected to the output of a limiting value circuit which, when the difference between one of the output values and the associated computed value exceeds a predetermined limiting value, changes the frequency input signal relatively to the desired value in the sense of a reduction of the difference. The limiting value circuit functions only during a dynamic operating situation when, on starting or changes in torque, strong accelerations or retardations occur. On excessively high acceleration, the motor slip can increase to such an extent that the pull-out torque is reached. On excessively high retardation, the motor can produce such high voltages that the inverter can be impaired. By correcting the input frequency, the limiting value circuit ensures that these effects do not arise.

For example, the limiting value circuit is preceded by a subtraction circuit fed with the two quantities to be compared in the first comparator. The subtraction result is a measure of the difference that could lead to disruptions.

Another possibility is for a second computer circuit to be provided which computes a computed frequency value from the voltage measurement signal and the current measurement signal, and for the limiting value circuit to be preceded by a subtraction circuit fed with the desired value of the frequency input signal and the computed frequency value.

The limiting value circuit will in the simplest case comprise two diodes, particularly Zener diodes, connected in anti-parallel.

The frequency input signal may be set by means of a simple potentiometer. However, it can also be introduced as an impulse series and fed to the computer circuit by way of a digital/analogue converter. This is often desirable because the impulses can be used either directly or by simple division as control impulses for the inverter.

The frequency input signal can also be fed to the division circuit as an impulse series, the division circuit comprising an integrator which integrates the voltage measurement signal between two successive pulses, and that a storage device stores each last integration result. Since the impulse spacing is inversely proportional to the frequency, the integration result corresponds to the desired quotient.

In many cases it is desirable that the voltage measurement device measures the voltage on the output side of the inverter between two phases and the impulses correspond to the frequency of the inverter. Since half-waves are supplied through the output side, each integration occurs during one half wave. In the meantime, until the next half-wave occurs, the integration result can be fed to the storage device and the contents of the integrator can be expunged.

It is also favourable if the current measurement device is associated with an amplifier with adjustable degree of amplification and giving the current measurement signal. In this way, an adaptation to motors of different power can be effected without changing the inverter circuit.

Further, the current measurement signal can be fed to the computer circuit by way of a time element, particularly an RC element. This prevents a disruptive feedback effect on the computed value, particularly the frequency of the inverter, from occurring when there is a certain amount of waviness in the current fed to the inverter.

In order that there is no drop below the pull-out torque of the motor, it is desirable to provide a limiting circuit which limits the slip frequency to about twice the nominal slip frequency. This can, for example, be effected in that a limiting circuit is applied in the path of the frequency signal, particularly the frequency input signal. If the frequency of the inverter and the permissible torque have an upper limit, the slip frequency is indirectly limited.

Advantageously, the voltage measurement signal is fed to a band pass filter of which the output signal is fed in the same sense as the current measurement signal to the third comparator. This counteracts fluctuations in the inverter voltage that might lead to hunting during operation.

It is particularly advantageous to provide a slip-compensating signal generator which delivers a slip compensating signal which is zero up to about the nominal frequency of the inverter and above this has a value increasing with the frequency. In particular, the slip compensating signal generator can be controlled by the same input value as is the computer element determining the factor proportional to the slip frequency. Whenever this factor and thus the slip is changed, slip compensation will occur.

In particular, an addition circuit may be provided in which a first slip compensating signal is added to the frequency signal, particularly the frequency input signal. In this way the effective frequency is increased with a rise in slip frequency so that the motor speed remains substantially constant.

Another possibility is an addition circuit in which a second slip compensating signal is added to the adjustable torque value fed to the third comparator. Whenever the slip frequency has to be increased at higher frequencies of the inverter, the effective torque will in this way also be increased, which permits the torque to be kept constant over a still larger range of speed.

In this connection it is desirable if the second slip compensating signal is fed by way of an amplifier of which the degree of amplification can assume at least two stages depending on the adjustable torque value, the higher stage being associated with a higher torque. This serves for adaptation to the non-linear curves in the operating diagram. In the extreme case, the degree of amplification can be changed continuously.

In a preferred embodiment, the output of the first comparator is connected to a sixth comparator which corresponds to the third comparator but is firmly set to the highest permissible torque. In this way one avoids overloading of the inverter when the maximum torque fed to the third comparator is increased by variable additive components relatively to the set value.

The invention will now be described in more detail with reference to examples shown in the drawing, wherein:

FIG. 11 is the operating diagram of a switchable amplifier;

FIG. 12 is the operating diagram of a minimum current generator;

FIG. 13 is the torque-frequency diagram of the circuit according to FIG. 6, which also applies to FIGS. 7 to 9;

FIG. 14 is the same diagram for the circuit according to FIG. 5 or 10;

Figure 1:
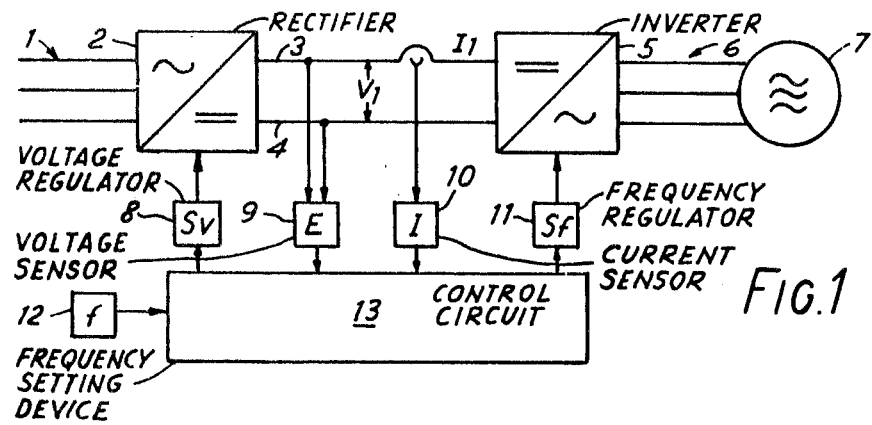
FIG. 1 is a block diagram of an inverter circuit according to the invention.

According to FIG. 1, a three-phase mains 1 energises a regulatable rectifier 2. The latter is connected by two D.C. lines 3 and 4 to an inverter 5 of which the three output lines 6 are connected to an asynchronous motor 7. The output voltage $U_1$ of the rectifier 2 is regulatable with the aid of a voltage regulator 8 which, with the aid of a voltage regulating signal Su, controls for example a vibrator. The regulated D.C. voltage $U_1$ is measured by a voltage measuring device 9 that delivers a voltage measurement signal E. The direct current $I_1$ is measured by a current measurement device 10 which delivers a current measurement signal I.

The frequency of the inverter 5 is regulatable by means of a frequency regulator 11 which feeds a frequency regulating signal Sf to the inverter. In addition, there is a desired value setting device 12 which delivers a frequency input signal f. In a control circuit 13, the three output values E, I and f are processed in such a way that the voltage regulating signal Su and the frequency regulating signal Sf operate the circuit so that the motor 7 has a constant slip or rotor frequency $f_2$.

Figure 2:
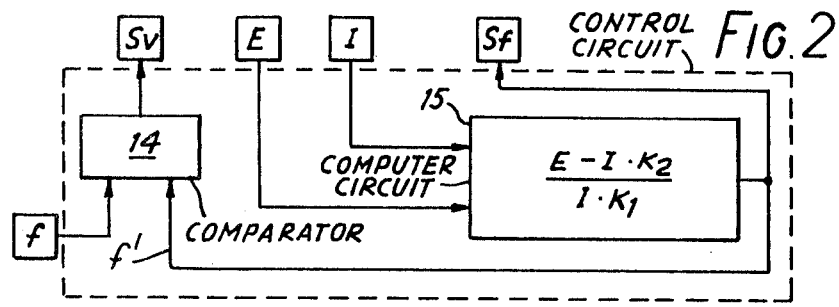
FIGS. 2 to 4 are block diagrams of three embodiments of the control circuit.

FIG. 2 first of all shows that the control circuit 13 comprises a comparator 14 and a computer circuit 15. In the computer circuit 15, a computed value f' of the frequency is calculated according to the equation (6) from the current measurement signal I and the voltage measurement signal E as well as two constants $k_1$ and $k_2$, the computed value being compared with the input frequency f in the comparator 14. The voltage regulating signal Su and thus the D.C. voltage $U_1$ are changed until the two values f and f' are equal. Regardless of the load torque, this leads to a constant slip or rotor frequency $f_2$ of the motor 7 and thus to a constant speed. The constant $k_1$ is inversely proportional to the slip frequency $f_2$ and the constant $k_2$ is proportional to the winding resistance of the stator of the motor.

Figure 3:
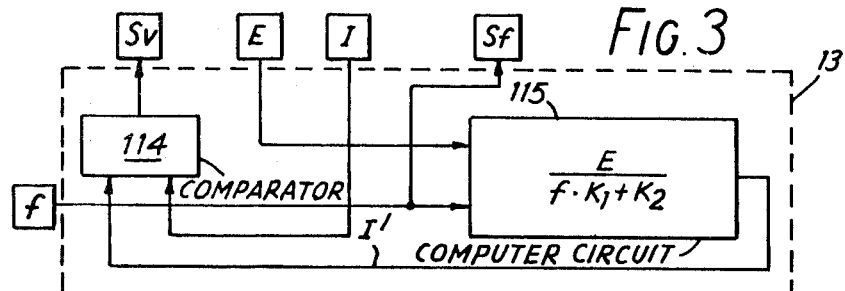

In the FIG. 3 embodiment, the control circuit 13 contains a comparator 114 and a computer circuit 115. The latter calculates a computed value I' of the current according to equation (7) from the voltage measurement value E and the frequency input value f, the computed value being compared with the current measurement value in the comparator 114. The voltage regulating signal Su is regulated until the values I and I' are equal. This likewise leads to the desired constant slip frequency.

Figure 4:
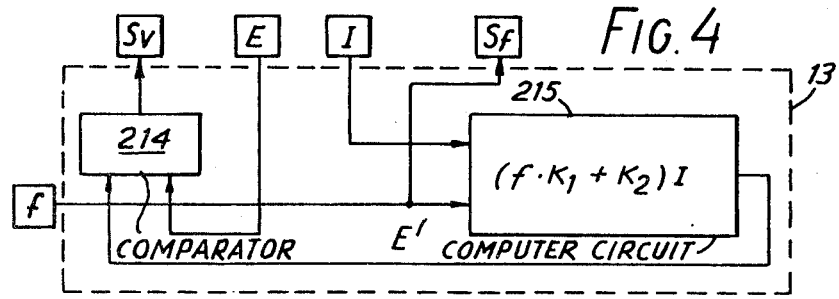

In FIG. 4, the control circuit 13 comprises a comparator 214 and a computer circuit 215. The latter calculates a computed value E' of the voltage according to equation (9) from the current measurement value I and the frequency input value f, the computed value being compared with the voltage measurement value E in the comparator 214. The voltage regulating signal Su is changed until the values E and E' are equal. This likewise leads to the desired constant slip frequency.

Figure 5:
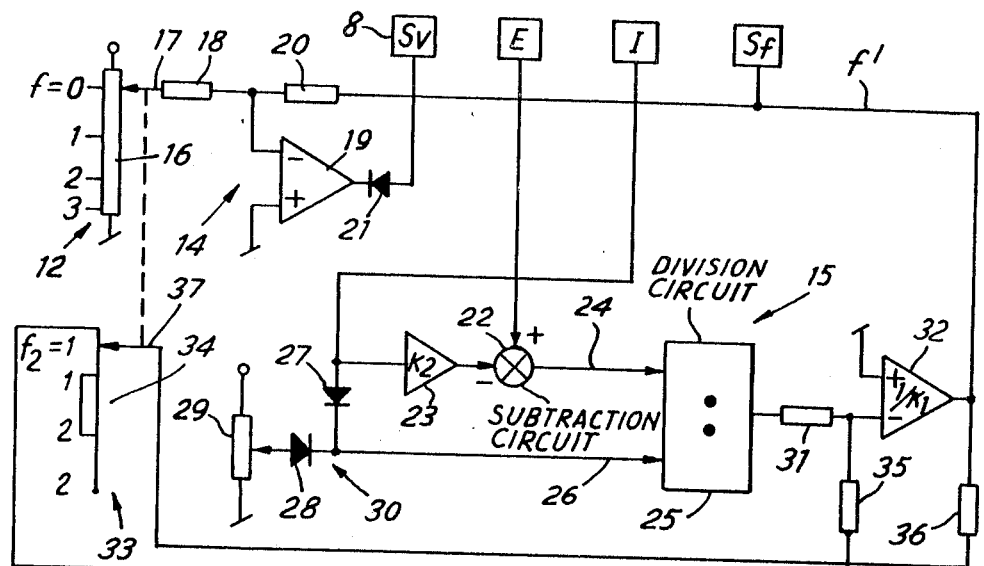
FIGS. 5 to 10 are detailed representations of six examples of the control circuit.

FIG. 5 shows a control circuit corresponding to FIG. 2. The desired value input device 12 comprises a potentiometer 16 of which the tapping 17 is connected by way of a first summating resistor 18 to the inverting input of an amplifier 19. In addition, the inverting input is fed with the computed value f' by way of a summating resistor 20. The output of the amplifier 19 is connected to the voltage regulator 8 by way of a diode 21.

The computer circuit 15 comprises a subtraction circuit 22 to which the voltage measurement signal E is fed in the positive sense and the value $k_2 \cdot I$ is fed in the negative sense by way of a multiplication element 23, e.g. an amplifier. The subtraction result is fed to the divided input 24 of a division circuit 25. The divisor input 26 is fed with the current measurement signal I by way of a diode 27. However, the input is additionally connected to the tapping of a potentiometer 29 by way of a second diode 28. The potentiometer forms a minimum current generator 30 which ensures that the divisor in the division circuit 25 does not become zero at low current measurement signals I. The quotient is fed by way of a resistor 31 to a computer element 32, e.g. an amplifier, in which the quotient is multiplied by the factor $1/k_1$. This gives the computed value f'. The factor $1/k_1$ is variable with the aid of a switch device 33. The latter consists of a special potentiometer 34 in the feedback circuit of the amplifier 32 formed by the resistors 35 and 36. The tapping 37 of the potentiometer 34 is mechanically coupled to the tapping 17 of the desired value input device 12. On a change in the input frequency up to the value 1 (corresponding to the nominal frequency of the connected motor), the slip frequency will not alter. Between the single and double value of the nominal frequency, the slip frequency will change from the single to the double value and upon a further increase in the input frequency the slip frequency will remain at the double value.

Figure 6:
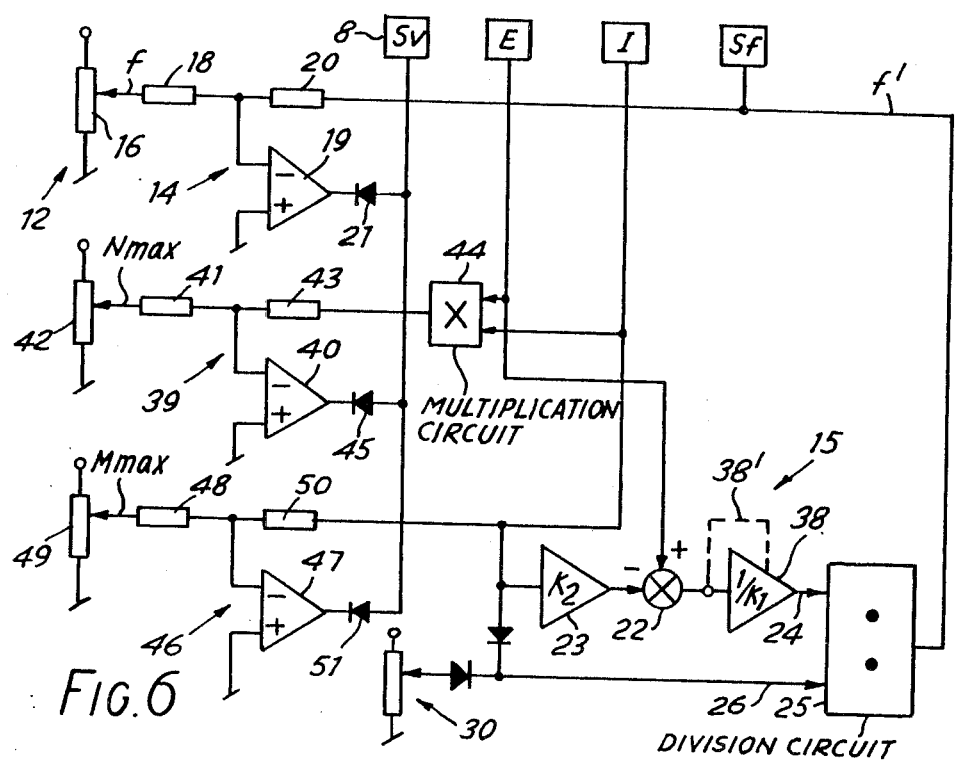

In the FIG. 6 embodiment, the control circuit 15 differs from that of FIG. 5 substantially in that the computer element 32 for the factor $1/k_1$ is connected in front of the dividend input 24 as the computer element 38. The amplification factor of this computer element can be switched by a switch element 38' depending on its input voltage, so that, on exceeding a limiting value of the magnetising voltage, the slip frequency $f_2$ will gradually increase from the single to a double value as will hereinafter be described in conjunction with FIG. 11. There is also a comparator 39. The latter comprises an amplifier 40 fed with a maximum power value $N_{max}$ by way of a summating resistor 41 from an adjustable potentiometer 42 and with the instantaneous power by way of a summating resistor 43. The instantaneous power is obtained as the output of a multiplication circuit 44 fed with the voltage measurement value E and the current measurement value I. The output of the amplifier 40 is applied to the voltage regulator 8 by way of a diode 45. As soon as the set value $N_{max}$ has been reached, this comparator takes over the voltage control of the inverter circuit. A further comparator 46 comprises an amplifier 47 fed with a maximum torque value $M_{max}$ by way of a summating resistor 48 from an adjustable potentiometer 49 and with the current measurement value I by way of a second summating resistor 50. The output of the amplifier 47 is connected to the voltage regulator 8 by way of a diode 51. As soon as the value $M_{max}$ has been exceeded, voltage control of the inverter circuit takes place by way of this comparator 46.

Figure 7:
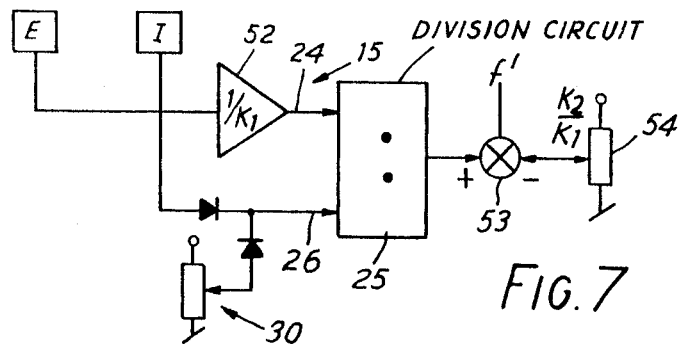

In the embodiment of FIG. 7, only the computer circuit 15 is shown. The rest of the circuit can be like that of FIG. 5 or FIG. 6. The division circuit 25 is, by way of a computer element 52, fed at the dividend input 24 with a voltage measurement value E which is related to the factor $1/k_1$. The current measurement value reaches the divisor input 26 and can be corrected by means of the minimum current generator 30. The quotient is fed to a subtraction circuit 53 in which a value $k_2/k_1$ is subtracted which is adjustable at a potentiometer 54. With this computer circuit, the computed value f' is calculated according to equation (5).

Figure 8:
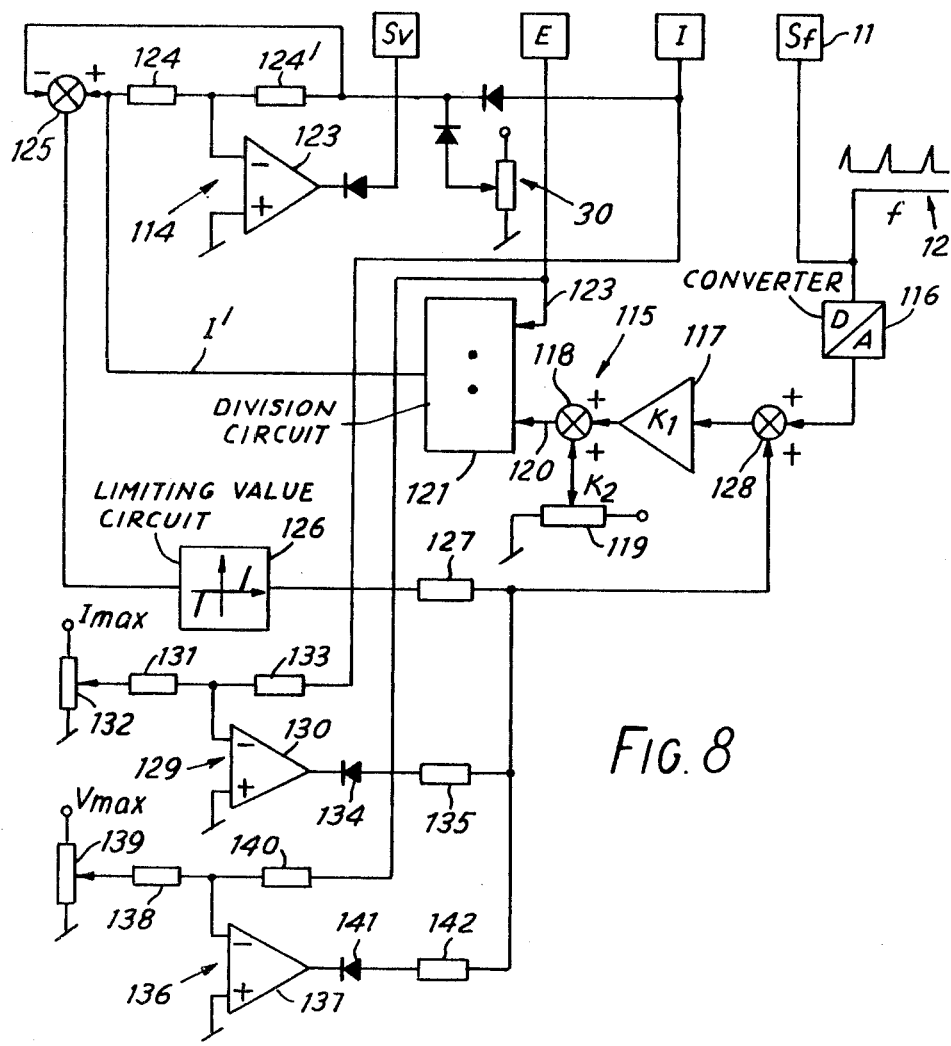

FIG. 8 shows a circuit corresponding to FIG. 3. The desired value input device feeds the input frequency f' in the form of an impulse series. This impinges directly on the frequency regulator 11. A digital/analogue converter 116 converts the signal to an analogue voltage. By way of a computer element 117 in which the product $k_1 \cdot f$ is formed, the analogue voltage is fed to a summating circuit 118 in which the product has the constant $k_2$ added to it that is derivable from a potentiometer 119. The result of the addition is fed to the divisor input 120 of a division circuit 121 of which the dividend input 123 is supplied with the voltage measurement value E. One thereby obtains the computed value I'. The latter is fed by way of a summating resistor 124 to the inverting input of an amplifier 123 of the comparator 114. This input is additionally fed by way of a summating resistor 124' with the current measurement signal I which can be corrected with the aid of a minimum current generator 30. This circuit gives a constant slip frequency according to equation (7).

The two values I and I' to be compared are additionally fed to a subtraction circuit 125. The difference influences a limiting value circuit 126 which consists of two Zener diodes connected in anti-parallel and therefore gives no output signals at small differences but at large differences gives a comparatively large output signal to an addition circuit 128 by way of a resistor 127. In the addition circuit, the frequency input signal f is corrected in a manner such that on excessive acceleration or excessive retardation, the frequency signal fed to the computer circuit is corrected in the sense of a smaller departure from the frequency of the motor calculated from the measured values.

A comparator 129 comprises an amplifier 130 of which the inverting input is fed with a maximum current value $I_{max}$ from a potentiometer 132 by way of a summating resistor 131 and the current measurement value I by way of a summating resistor 133. The amplifier output 130 is likewise connected to the input of the addition element 128 by way of a diode 134 and a resistor 135. When the set value $I_{max}$ is exceeded, a correcting signal is obtained with which the frequency fed to the computer circuit is reduced relatively to the set desired value f.

A further comparator 136 comprises an amplifier 137 of which the inverting input is fed with a maximum voltage value $U_{max}$ from an adjustable potentiometer 139 by way of a summating resistor 138 and with the voltage measurement value E by way of a second summating resistor 140. The amplifier output is likewise connected to the one input of the addition circuit 128 by way of a diode 141, which is oppositely poled to the diode 134, and a resistor 142. When a maximum voltage $U_{max}$ is exceeded, the frequency input signal is corrected in a manner such that the frequency fed to the computer circuit is increased.

Figure 9:
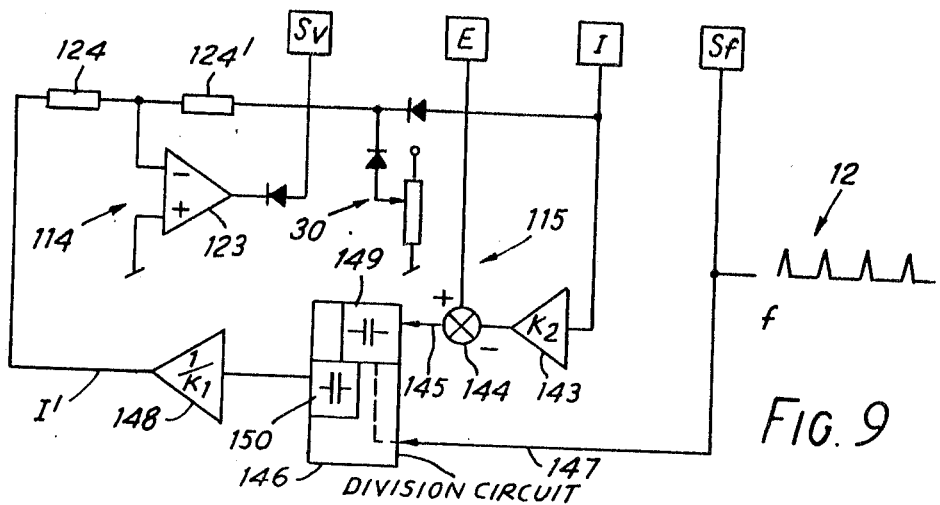

FIG. 9 illustrates a computer circuit 115 operating according to equation (8). In it the current measurement signal I is provided with the factor $k_2$ in a computer element 143. This product is fed to the minus input of a subtraction circuit 144 of which the plus input is supplied with the voltage measurement signal E. The result of subtraction is fed to the dividend input 145 of a division circuit 146 of which the divisor input 147 is fed with the frequency input signal f. The quotient is related to the factor $1/k_1$ in a computer element 148. This gives the computed quantity I' which is compared with the current measurement value I in the comparator 114.

Because of the supply of the frequency input signal f as an impulse series, the division circuit 146 is designed so that an integrator 149 integrates the signal at the input 145 between two successive pulses that are fed by way of the input 147. The result of integration is in each case transmitted to a storage device 150 so that it is also available during the course of integration. Simultaneously, or immediately after transmission to the storage device, the integrator is returned to zero.

Figure 10:
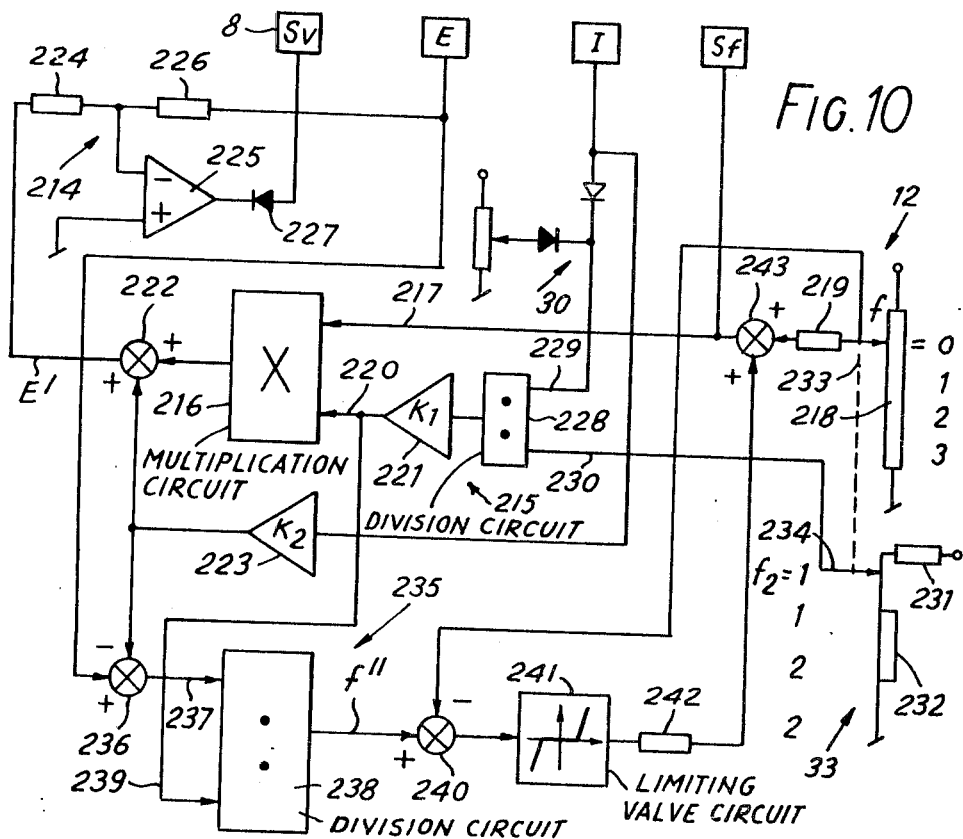

The FIG. 10 circuit corresponds to FIG. 4 and operates according to equation (9). The computer circuit 215 comprises a multiplication circuit 216 of which the one input 217 is fed with the frequency input value from a potentiometer 218 by way of a resistor 219 and the other input 220 is fed by way of a computer element 221, in which the current measurement value is related to the factor $k_1$, with the current measurement value I corrected by the minimum current generator 30. The product is fed to one input of an addition circuit 222 of which the other input is connected to the output of a computer element 223 supplied with the current measurement value I, so that this input is fed with the product $I \cdot k_2$. The summation result corresponds to the computed value E' of the voltage. This is fed to the inverting input of an amplifier 225 of the comparator 214 by way of a summating resistor 224. The same input is fed with the voltage measurement signal E by way of a summating resistor 226. The output of the amplifier controls the voltage regulator 8 by way of a diode 227.

The computer element 221 is preceded by a division circuit 228 of which the dividend input 229 is fed with the current measurement value I. Normally the value 1 exists at the divisor input 230, this value being tapped from a voltage divider consisting of a fixed resistor 231 and a special potentiometer 232. The tappings 233 of the desired value setting device and 234 of the special potentiometer 232 are mechanically intercoupled in the following manner. When the frequency input value lies between zero and the nominal motor frequency, the divisor has the value 1. Between the single and double nominal frequency, the divisor increases from 1 to 2. Above double the nominal frequency, the divisor remains at the value 2. In function, this corresponds to the FIG. 5 arrangement. In addition a second computer circuit 235 is provided. In a subtraction circuit 236, the product $I \cdot k_2$ is subtracted from the voltage measurement value E. The subtraction result is fed to the dividend input 237 of a division circuit 238 of which the divisor input 239 is fed with the product $I \cdot k_1$. One therefore obtains at the output a computed value f'' which is calculated according to the equation $$f'' = \frac{E - I \cdot k_2}{I \cdot k_1} \quad (10)$$

This equation corresponds to equation (6). This computed value f'' is compared with the frequency input value f in a subtraction circuit 240. The difference serves as the input signal for a limiting value circuit 241 corresponding to the limiting value circuit 126. Its output value is fed by way of a resistor 242 to an addition circuit 243 so that the frequency input value f can be corrected when the frequency f'' calculated from the measured values shows an excessively large difference from the frequency f that is actually introduced.

FIG. 11 shows the operating curve of the computer element 38 designed as an amplifier. Its input value $E - I \cdot k_2$ corresponds to the magnetising voltage. Since at higher motor frequencies and constant slip frequency this magnetising voltage goes beyond the maximum voltage available at the inverter input, this constant slip frequency is maintained only up to just below the nominal voltage (limiting value G) represented by 100% $E_{max}$. Thereafter, there is a correction such that the input value 100% $E_{max}$ also corresponds to the output value 100% $E_{max}$, which causes a change in the slip frequency in this upper voltage range.

The operation of the minimum current generator 30 is evident from FIG. 12. When the current measurement value I and thus the active motor current $I_1$ approaches zero on the line A, the minimum current generator 30 takes over the generation of signals along the line B. The value $I_{korr}$ that is effective in the computer circuit can therefore never drop below a predetermined value, e.g. 22%, which corresponds approximately to a minimum torque of 5%.

FIG. 13 is the torque-frequency operating diagram of an inverter circuit according to FIG. 6. The operating range extends over a frequency of 0 to 300% of the nominal motor voltage $f_{lnenn}$. The minimum current generator 30 is effective in the entire operating range. For this reason the range C is inoperative for the regulation. Between zero and about 100% of the nominal frequency, the torque is limited only by the horizontal M=100%. This takes place as a result of setting the potentiometer 49. For each operating point lying between the line M=100% and the region C, a constant motor speed is obtained for each desired torque that is determined by the input frequency f and the slip frequency selected by means of the factor $1/k_1$. In the frequency range between 100 and 200%, these conditions can be maintained up to the line $f_2=100\%$. For a higher torque, there is a higher magnetising voltage which leads to switching over of the regulating element 38 corresponding to FIG. 11. The result of this is that at higher torques the slip frequency gradually increases to double the value. The upper limit that is here effective is the maximum power $N_{max}$ which was set by the potentiometer 42 and which leads to a hyperbola N=100%. The motor can even be operated in the frequency range from about 200 to 300%, the same conditions as before being applicable. Only the upper limit is prescribed by the line $f_2=200\%$ because on a further increase in the slip frequency one would fall below the pull-out point. From all of this it will be evident that with the aid of the inverter circuit a motor can be operated independently of the torque at a constant rotary speed over an extraordinarily large frequency range and an extraordinarily large torque range and that even at higher frequencies operation will still be possible in the region E if one permits a twofold increase in the slip frequency.

In the diagram according to FIG. 14, which may for example correspond to the embodiment of FIG. 5, the upper limits are the same as in the FIG. 13 diagram. By reason of the potentiometer 34 mechanically coupled to the frequency input potentiometer 16, however, one obtains different conditions below the upper limiting curves. Up to the nominal frequency, there are no differences. In the frequency range from about 100 to 200%, the slip frequency increases in proportion to the frequency increase. Between 200 and 300%, the twofold slip frequency is constant. Since each frequency input signal f is associated with a constant slip frequency $f_2$, no departures from the set speed occur for all the permissible torques.

Extraordinarily high accuracies can be achieved at constant rotary speed with the aid of the principle of the present inverter circuit. With a conventional asynchronous motor, one can in this way keep every set speed constant up to 10% of the maximum speed within a tolerance of ±0.5% within the entire load range from zero up to full load torque.

Figure 15:
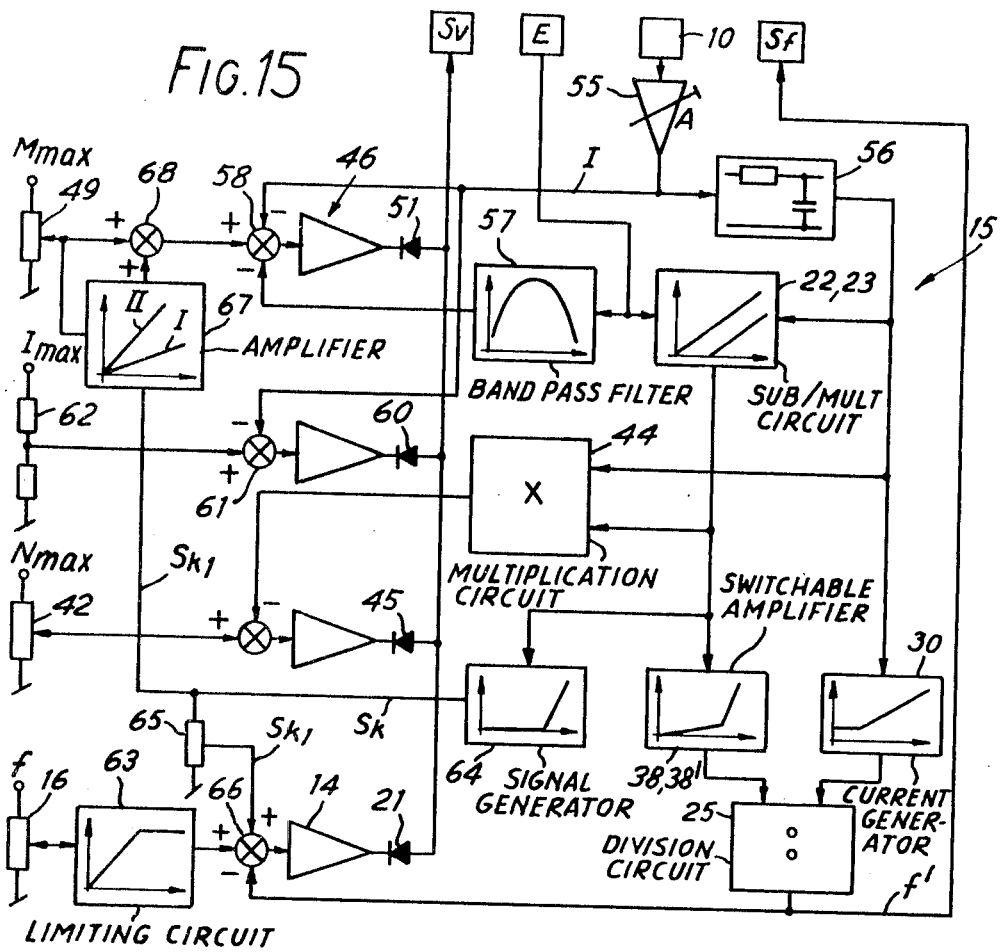
FIG. 15 is a circuit diagram corresponding to FIG. 6, which contains additional circuit components and is represented as functional blocks.

Still higher requirements can be met with the circuit according to FIG. 15 which is similar to FIG. 6 and in which the same reference numerals are used but which contains still further circuit components. For a better illustration, some of the circuit components are shown as function blocks in each of which the input signal is entered on the abscissa and the output signal on the ordinate in a coordinate representation.

The path of the current measurement signal I contains an amplifier 55 with a variable amplification factor A. This permits motors of different size to be connected to the same inverter circuit even though the inverter circuit itself is designed for only one particular motor size.

If a motor is connected which has a lower nominal power than the nominal power of the inverter circuit, the full load current of the smaller motor would correspond to a partial load current of the larger motor. Consequently the smaller motor would be undermagnetized at full load and would also have insufficient magnetisation at every partial load. This would result in an undesirable higher slip frequency and make it possible for the pull-out torque of the motor to be exceeded. All these disadvantages can be avoided in a simple manner by increasing the amplification factor A in the amplifier 55. If, for example, a motor with half the nominal power is connected, the amplification factor A need merely be doubled. All the operations in the inverter circuit will then be performed at half the motor current.

The current measurement signal is fed to the computer circuit 15 by way of a time element 56, particularly an RC element. The time constant of this element, which may for example amount to 0.2 s, ensures that a certain amount of waviness in the inverter current will not have any effects in the computer circuit 15. In particular, the frequency of the inverter will not change under the influence of this current waviness. This time constant also influences the speed with which the inverter circuit moves to a new operating point. However, the time constant can readily be selected so that the influence of the current waviness is suppressed but the approach to a new operating point proceeds sufficiently rapidly.

The voltage measurement value E is fed not only to the computer circuit 15 but also to a band pass filter 57 which is impenetrable for D.C. voltage but allows an A.C. voltage component to pass to a larger or less extent depending on its frequency. This A.C. voltage component forms the output signal of the band pass filter 57 and is fed in a mixing stage 58 to the comparator 46 in the same sense as the current measurement signal I. The band pass filter is desirably tuned to the resonance frequency of the filter circuit that is conventional for a regulatable rectifier 2. In this way one avoids hunting of the connected motor such as that occurring on a sudden load change with torque control. This hunting become noticeable because of the voltage changes. The A.C. voltage component acts as a feedback.

Since with this regulation the maximum motor current must not be exceeded, a further comparator 59 is provided of which the output is connected by way of a diode 60 to the outputs of the other comparators 14, 39 and 46. This comparator has a subtraction circuit 61 which is fed on the one hand with the current measurement signal I and on the other hand from a voltage divider 62 with a fixed reference signal as the highest permissible current value $I_{max}$. This comparator 59 therefore takes over the control of the voltage regulation signal Su as soon as the maximum current has been exceeded. The slip frequency of the motor must not, even under extreme conditions, become so large that one falls below the pull-out torque. This generally occurs when the actual slip frequency is larger than three times the nominal slip frequency. Since non-linear conditions obtain between the slip frequency and torque, which can be taken into account in the computer circuit with only very large expense, it is recommended that the slip frequency be limited to about twice the nominal slip frequency. This can for example be effected by a corresponding design of the switchable amplifier 38, 38'.

However, in the present circuit there is indirect limiting by the limiting circuit 63 which prevents the frequency input signal f from exceeding a predetermined limiting value. If a maximum frequency has on the one hand been set by the circuit 63 and the maximum load has on the other hand been set by the comparator 59, then, conversely, the slip frequency can also not exceed a predetermined limiting value.

This also applies even if additional slip compensaton is provided for. A slip compensation signal generator 64 is influenced by the same input quantity as the switchable amplifier 38, namely the value $E-I \cdot k_2$. With reference to FIG. 11, it will be recalled that at a limiting value G in the switchable amplifier 38 there is a change in the factor $1/k_1$. Up to this limiting value G, the slip compensation generator 64 gives a slip compensation signal Sk=0. On exceeding this limiting value G, the signal Sk increases continuously. The signal Sk is therefore effective only if the factor $1/k_1$ responsible for the slip frequency is increased, e.g. doubled. A first slip compensating signal Sk1 is tapped at a potentiometer 65 and superimposed on the frequency input signal f in a mixing stage 66 of an addition circuit. The result of this is that the frequency of the inverter is continuously increased when the slip frequency is reduced by means of the amplifier 38. Consequently, one obtains a high speed constancy. A second slip compensating signal Sk2, which may be identical with the slip compensating signal Sk, is fed to an amplifier 67 which has two amplifier characteristic lines I and II. At low values of the maximum torque value $M_{max}$ set at the potentiometer 49, the characteristic line I applies whereas at higher torque values the line II applies. The output value is added to the maximum torque value in an addition circuit 68. As a result, whenever a maximum torque value was set that was not equal to the highest permissible load, the set maximum torque can be kept constant over a larger speed range, as will be explained in conjunction with FIG. 16.

Figure 16:
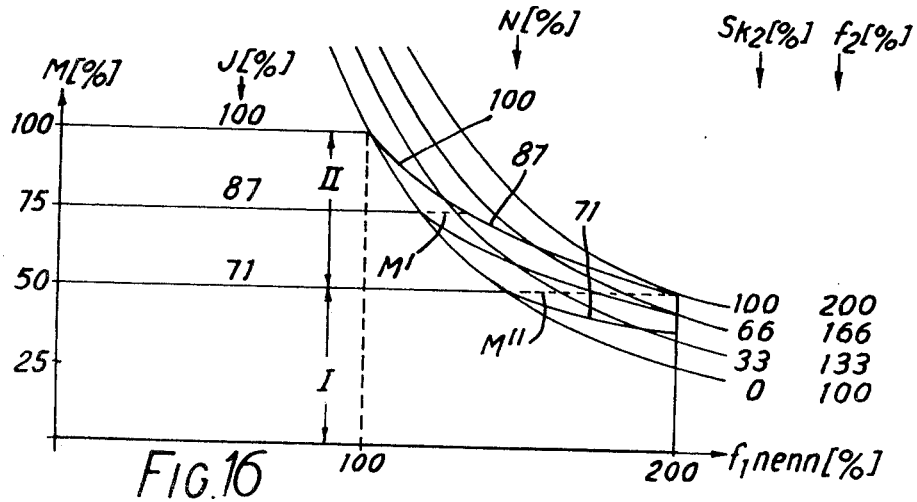
FIG. 16 is a diagram corresponding to FIG. 13.

As in FIG. 13, the torque M is applied by way of the inverter frequency f1 in FIG. 16. Three different operating conditions are examined in which the maximum torque was set to 100, 75 and 50%. This corresponds to currents I of 100, 87 and 71%. Above the nominal frequency, the power hyperbolas N of 100, 87 and 71% correspond to these curves. It will be seen that at a torque setting below 100%, the torque above a predetermined frequency f1 drops even though there is torque in reserve. This is exhausted in that the slip compensating signal Sk2 is superimposed on the set torque value M, this superimposition proceeding in the same sequence as the increase in the slip frequency f2. By means of this superimpositioning, one obtains the extended straight torque lines M' and M" from which it is seen that for example a set torque M of 50% can be maintained up to twice the nominal frequency. It should be noted that at higher torques which intersect the power hyperbola at steeper sections, larger additions of slip compensation are necessary than at smaller torques. This is taken into account by the two amplifier characteristic lines I and II of the amplifier 67. It will be clear that a higher accuracy can be achieved if the degree of amplification is changed continuously with the set torque $M_{max}$. The limit at an inverter frequency of 200% f1$_{nenn}$ is the effect of the limiting circuit 63.

The illustrated circuits are merely examples. The computer circuits can be embodied in different ways. For example, instead of the division circuits one may use multiplication circuits at which the divisor is supplied as the reciprocal value. Instead of feeding the one output value direct to the comparator, one can also process it in the computer circuit and then compare two intermediate results with one another.

We claim:

1. An inverter circuit assembly for operating an adjustable speed asynchronous motor with a constant slip frequency, comprising an inverter, a three phase rectifier for converting a three phase supply to DC, a pair of conductors between said rectifier, and said inverter, a voltage regulator for regulating the output voltage of said rectifier, a frequency regulator for regulating the output frequency of said inverter, a frequency setting control device having a data value (f), a voltage measurer and a current measurer between said rectifier and said inverter having data values (E) and (I), a control unit for processing said values (f), (E) and (I) to form control signals for said voltage regulator and said frequency regulator, a computer circuit in said control unit having a built in constant ($k_1$) inversely proportional to the predetermined slip frequency and a constant ($k_2$) proportional to the winding resistance of the motor stator, said computer circuit being operable to calculate a computed value based on two of said three data values and said constants, and a comparator in said control unit for controlling said voltage regulator which inputs and compares the other one of said three data values and said computed value, said frequency regulator being controlled by said computed value when said data value (f) is a compared value, and said frequency regulator being controlled by said data value (f) when one of the other of said data values is a compared value.

2. An inverter circuit according to claim 1 wherein said computer circuit includes means for maintaining constant ($k_1$) constant below the nominal rotary speed at least over the major part of the motor operating range.

3. An inverter circuit according to claim 1 wherein said computer circuit calculates said computed value according to the equation $$f' = \frac{E - I \cdot k_2}{I \cdot k_1}$$

4. An inverter circuit according to claim 1 wherein said computer circuit calculates said computed value according to the equation $$E' = (f \cdot k_1 + k_2) I$$

5. An inverter circuit according to claim 1 wherein at least one of said constants is adjustable.

6. An inverter circuit according to claim 1 wherein said computer circuit includes a minimum current generator which holds the current measurement signal (I) at a predetermined minimum value for small values of the measured current.

7. An inverter circuit according to claim 1 wherein said computer circuit includes a computer element which introduces a factor ($1/k_1$) proportional to the slip frequency and holds it constant in the operative range up to about the nominal motor frequency, and a switch element which increases this factor above the nominal frequency.

8. An inverter circuit according to claim 7 wherein said switch element is mechanically coupled to said frequency control device.

9. An inverter circuit according to claim 1 wherein said computer circuit includes a computer element which introduces a factor ($1/k_1$) proportional to the slip frequency and holds it constant in the operating range up to just below the nominal voltage, and a second switch element which increases this factor above this voltage limiting value.

10. An inverter circuit according to claim 9 wherein said second switch element is controlled by a control signal which is equal to the voltage measurement signal (E) reduced by a current-proportional value ($I \cdot k_2$), and the voltage limiting value corresponding to about 90 to 95% of the nominal motor voltage.

11. An inverter circuit according to claim 1 including a division circuit, said frequency signal (f) being fed to said division circuit as an impulse series, said division circuit including an integrator for integrating said voltage measurement signal (E) between two successive pulses, and a storage device for storing each last integration result.

12. An inverter circuit according to claim 11 wherein said voltage measurement device measures the voltage on the output side of said inverter between two phases and the impulses correspond to the frequency of said inverter.

13. An inverter circuit according to claim 1 wherein said computer circuit calculates said computed value according to the equation $$I' = \frac{E}{(f \cdot k_1 + k_2)}$$

14. An inverter circuit according to claim 13 including a limiting value circuit, said frequency control device having the output thereof connected to the output of said limiting value circuit which, when the difference between one of said output values and the associated computed value exceeds a predetermined limiting value, changes said frequency input signal (f) relatively to the desired value in the sense of a reduction of the difference.

15. An inverter circuit according to claim 14 wherein said limiting value circuit is preceded by a subtraction circuit fed with the two quantities to be compared in said first named comparator.

16. An inverter circuit according to claim 14 including a second computer circuit for computing a frequency value (f′) from said voltage measurement signal (E) and said current measurement signal (I), wherein said limiting value circuit is preceded by a subtraction circuit fed with the desired value of the frequency input signal (f) and said computed frequency value (f″).

17. An inverter circuit according to claim 14 wherein said limiting value circuit includes two diodes, connected in anti-parallel.

18. An inverter circuit according to claim 14 wherein said limiting circuit limits said slip frequency to about twice the nominal slip frequency.

19. An inverter circuit according to claim 1 including a second comparator having its output connected to the output of said first comparator, said second comparator comparing an adjustable maximum power value with the product of a factor corresponding approximately to said measured current (I) and a factor corresponding approximately to said measured voltage (E) and overrides said first comparator when said product exceeds the maximum power value.

20. An inverter circuit according to claim 19 including a third comparator connected to the output of said first comparator, said third comparator comparing an adjustable maximum torque value with a comparative value corresponding to the measured current (I) and overrides said first comparator when said comparative value exceeds the maximum torque value.

21. An inverter circuit according to claim 20 including a fourth comparator, said frequency control device having the output thereof connected to the output of said fourth comparator which compares an adjustable maximum current value ($I_{max}$) with the current measurement signal (I) and reduces the frequency input signal (f) relatively to the desired value when the current measurement signal exceeds the maximum current.

22. An inverter circuit according to claim 21 including a fifth comparator, said frequency control device having the output thereof connected to the output of said fifth comparator which compares an adjustable maximum voltage ($U_{max}$) with the voltage measurement signal (E) and increases the frequency input signal (f) relatively to the desired value when the voltage measurement signal exceeds the maximum voltage.

23. An inverter circuit according to claim 20 including a slip compensating signal generator for providing a slip compensating signal (Sk) which is zero up to about the nominal frequency of the inverter and above this has a value increasing with the frequency.

24. An inverter circuit according to claim 23 including a computer element for determining said factor ($1/k_1$) proportional to the slip frequency, said slip compensating signal generator being controlled by the same input value as said computer element.

25. An inverter circuit according to claim 23 including an addition circuit in which a first slip computing signal (sk1) is added to said frequency input signal (f).

26. An inverter circuit according to claim 23 including an addition circuit in which a second slip compensating signal (sk2) is added to the adjustable torque value ($M_{max}$) fed to said third comparator.

* * * * *